United States Patent
Shamasundar et al.

(10) Patent No.: US 11,743,226 B2
(45) Date of Patent: Aug. 29, 2023

(54) COMMUNICATION SYSTEM PROCESSING EXTERNAL CLEARANCE MESSAGE FUNCTIONS

(71) Applicant: Honeywell International Inc., Morris Plains, NJ (US)

(72) Inventors: Raghu Shamasundar, Bangalore (IN); Willie Truong, Glendale, AZ (US); Jon Jenkins, Phoenix, AZ (US); Wen Hua Liu, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 5 days.

(21) Appl. No.: 16/138,738

(22) Filed: Sep. 21, 2018

(65) Prior Publication Data

US 2020/0099651 A1  Mar. 26, 2020

(51) Int. Cl.
  *H04L 51/56* (2022.01)
  *H04W 4/42* (2018.01)
  *G08G 5/00* (2006.01)

(52) U.S. Cl.
  CPC ............ *H04L 51/56* (2022.05); *G08G 5/0013* (2013.01); *G08G 5/0021* (2013.01); *H04W 4/42* (2018.02)

(58) Field of Classification Search
  CPC .................................................. G08G 5/065
  See application file for complete search history.

(56) References Cited

U.S. PATENT DOCUMENTS

| | | | |
|---|---|---|---|
| 7,848,877 B2 | 12/2010 | Goodman et al. | |
| 7,877,197 B2* | 1/2011 | Lewis | G08G 5/0039 |
| | | | 701/120 |
| 7,979,199 B2* | 7/2011 | Judd | G08G 5/0013 |
| | | | 701/120 |
| 8,014,907 B2* | 9/2011 | Coulmeau | G08G 5/0039 |
| | | | 244/186 |
| 8,849,476 B2 | 9/2014 | Coulmeau et al. | |
| 9,293,050 B2 | 3/2016 | Judy | |
| 9,330,573 B2 | 5/2016 | Brandao et al. | |
| 2008/0163093 A1* | 7/2008 | Lorido | G06F 3/0483 |
| | | | 715/771 |
| 2008/0167885 A1* | 7/2008 | Judd | G08G 5/0013 |
| | | | 701/120 |
| 2013/0080043 A1* | 3/2013 | Ballin | G08G 5/0078 |
| | | | 701/120 |
| 2013/0085669 A1* | 4/2013 | Bailey | G08G 5/0091 |
| | | | 701/467 |
| 2015/0089392 A1 | 3/2015 | McGuffin et al. | |
| 2016/0093222 A1* | 3/2016 | Hale | G08G 5/0021 |
| | | | 701/120 |

(Continued)

*Primary Examiner* — Mohamed A. Wasel
*Assistant Examiner* — Tesfu N Mekonen
(74) *Attorney, Agent, or Firm* — Fogg & Powers LLC (57) ABSTRACT

A method of communicating messages is provided. The method comprises receiving a message from a first station; determining whether the message requires clearance from a second station; displaying clearance intended message determined to require clearance from the second station to a consumer of the message; automatically translating the clearance intended message to a format understood by the second station; and routing the translated message to the second station upon selection of the clearance intended message by the consumer of the message.

17 Claims, 9 Drawing Sheets

(56) References Cited

U.S. PATENT DOCUMENTS

| | | | |
|---|---|---|---|
| 2016/0125744 A1* | 5/2016 | Shamasundar | G08G 5/0039 |
| | | | 701/122 |
| 2016/0171899 A1* | 6/2016 | Depare | G01C 21/20 |
| | | | 701/120 |
| 2016/0180715 A1* | 6/2016 | Burke | G08G 5/0013 |
| | | | 701/467 |
| 2016/0347471 A1* | 12/2016 | Shamasundar | G08G 5/0052 |
| 2017/0076611 A1* | 3/2017 | Shamasundar | G08G 5/0047 |
| 2017/0295031 A1* | 10/2017 | Bush | H04L 45/70 |
| 2018/0005533 A1* | 1/2018 | Lohmiller | G08G 5/0052 |
| 2018/0225976 A1* | 8/2018 | Rinehart | G08G 5/0013 |

* cited by examiner

COMMUNICATION SYSTEM PROCESSING EXTERNAL CLEARANCE MESSAGE FUNCTIONS

BACKGROUND

Airline Operational Communications (AOC) Datalink technology is an air/ground datalink communication system developed specifically for the airline industry, where a network of ground radio stations ensures that aircraft can communicate in real-time from practically anywhere in the world. The network relays messages between ground-based organizations and the cockpit. AOC communication is achieved through Aero Nautical Radio (VHF Data Link), Aircraft Communications and Reporting System (ACARS) an onboard digital computer display, two-way communication device or via satellite communications (SATCOM).

AOC (Airline Operational Control) messages serve to enhance the airlines operations and provide beneficial functionality to increase efficiency, reduce fuel usage and ensure timely communication and information exchange between air to ground and vice versa. Typical AOC messages exchanged between AOC and Aircraft relate to aircraft performance, takeoff data, fuel, wind, temperature and other routine information. Accordingly, AOC technology plays a significant role in operational and fuel efficiency of many airlines.

Air traffic controller (ATC) communications, on the other hand, are significant to maintain safe, orderly and expeditious flow of traffic in the global air traffic system. Conventionally, communicating AOC messages to an ATC station requires a time consuming process by the on-board crew of an airplane.

For the reasons stated above and for other reasons stated below, it will become apparent to those skilled in the art upon reading and understanding the specification, there is a need in the art for automatic translation and communication of messages between two stations such as an AOC station and an ATC station or between cockpit external and onboard communication system.

SUMMARY

The following summary is made by way of example and not by way of limitation. It is merely provided to aid the reader in understanding some of the aspects of the subject matter described. Embodiments provide systems and methods to communicate between two stations through existing communication channels.

In one embodiment, a method of communicating messages comprises: receiving a message from a first station; determining whether the message requires clearance from a second station; displaying clearance intended message determined to require clearance from the second station to a consumer of the message; automatically translating the clearance intended message to a format understood by the second station; and routing the translated message to the second station upon selection of the clearance intended message by the consumer of the message.

In another embodiment, a communication system comprises: a display; a user input; a communication assembly to provide communication functions of a vehicle, the communication assembly configured to communicate with at least a remote first station and a remote second station, the communication assembly including: at least one processor in communication with the display and user input, the at least one processor configured to: determine if a message received from the first station requires clearance from the second station, display each clearance required message to a consumer of the message via the display, automatically translate each clearance intended message to a format understood by the second station; and cause the communication assembly to communicate each translated clearance intended message to the second station based upon an input of a consumer of the message via the user input.

In yet another embodiment, a non-transitory computer readable medium storing a program having instructions stored thereon, executable by a processor, to perform a method for interfacing between first and second electronic systems is provided. The method comprises: determining whether a message received from a first station requires clearance from a second station; displaying clearance intended message determined to require clearance from the second station to a consumer of the messages; automatically translating the clearance intended message to a format understood by the second station; and routing the translated message to the second station upon selection of the clearance intended message by the consumer of the message.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Often, an onboard crew receives a message from the AOC when the airplane is in-flight that requires clearance from the air traffic controller in real time. For example, an AOC station may provide modification to flight plan when the airplane is traveling from point A to point B. Because such a modification deviates from the operational flight plan, it may require clearance from an ATC station prior to loading the new flight plan on the flight management system. In conventional systems, the onboard crew, such as the pilot, is unable to differentiate between typical AOC messages and messages that may require clearance from a second station, such as an ATC station. Accordingly, conventionally, in such situations, the onboard crew has to perform time consuming steps to identify a message that requires clearance from an ATC station and to generate a clearance request with datalink system in a format that is understandable by an ATC station.

Embodiments provide systems and methods to communicate between two stations through existing communication channels. The embodiments described herein automatically identify a message received from a first station that requires clearance from a second station and automatically build a request for clearance to be downlinked to the second station. In some embodiments, the clearance request to be downlinked to the second station is an ATC clearance request. In some embodiments an element identifier is defined within the message received from the first station to indicate that the intended message is for revised clearance purpose. Accordingly, embodiments of systems and methods provide required cues on a display screen for the crew to preview the intended message prior to downlinking the message to the second station for clearance.

Figure 1:
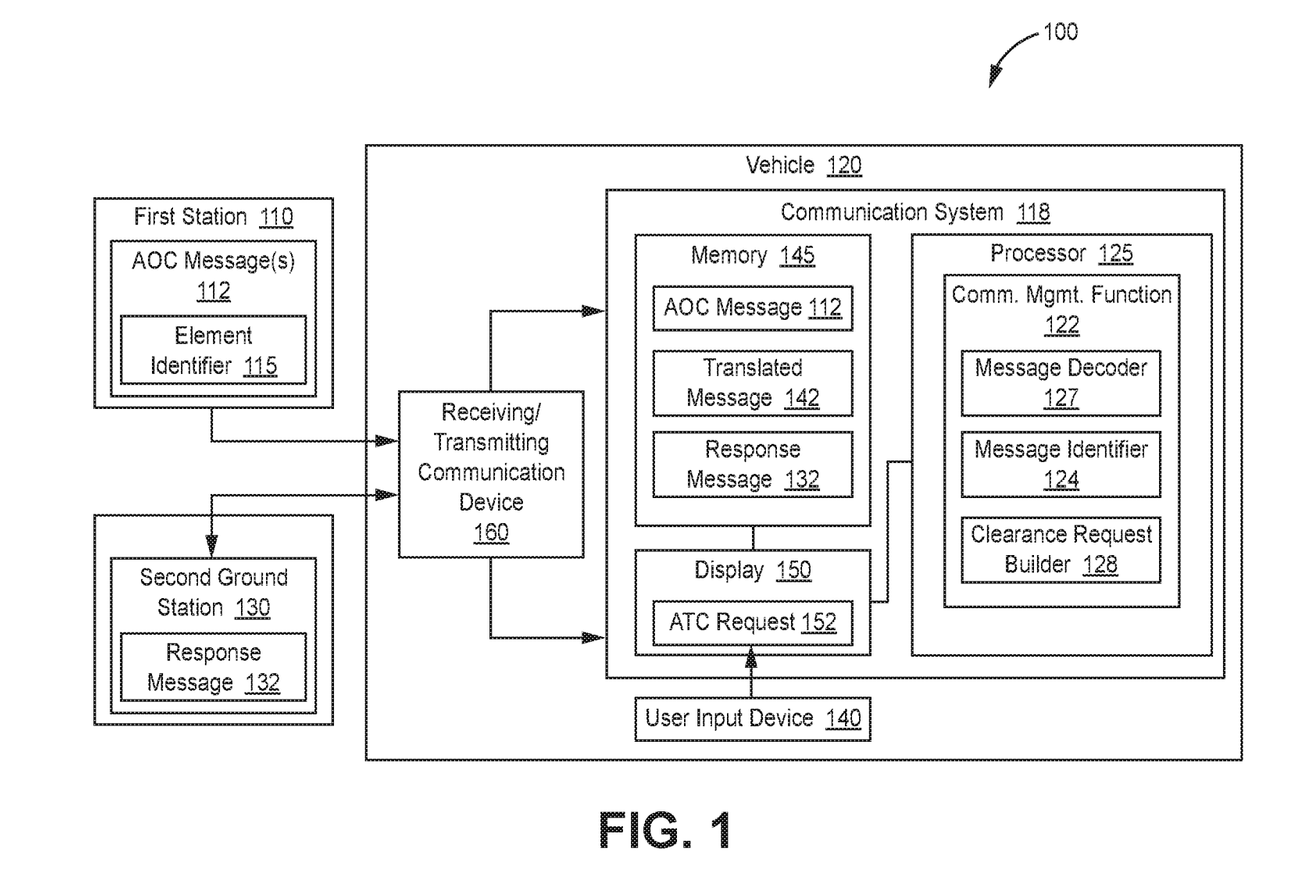
FIG. 1 illustrates one exemplary embodiment of a system for communicating messages between two stations.

FIG. 1 illustrates a system 100 for communicating messages between two stations. System 100 includes a first station 110, a vehicle 120 and a second station 130. In one exemplary embodiment, the first station 110 is an airline operational communications (AOC) ground station An AOC system is a type of data link communication system and is configured to communicate messages between ground stations such as first station 110 and on-board system of a vehicle 120. In one exemplary embodiment, vehicle 120 is an aircraft. In one exemplary embodiment, second station 130 is an air traffic control (ATC) ground station.

As shown in FIG. 1, first station 110 communicates message(s) 112 to vehicle 120. Message 112 is in a first format that is understood by the first station 110 but may not be understood by other ground stations, such as station 130. Accordingly, when message 112 is a message that needs clearance from an air traffic controller (ATC) station 130, station 110 includes an element identifier 115 with the message 112 sent to vehicle 120. The element identifier 115 assists vehicle 120 in identifying that the message needs to be converted into a second format that can be understood by second station 130. For example, a message that needs ATC clearance may include the phrase "AM:ATC" tagged with the message 112. Such a message 112 including an identifier is also referred to herein as a clearance intended message.

Vehicle 120 includes a receiving and/or transmitting communication device 160 that receives clearance intended message 112 from first station 110. Receiving and/or transmitting communication device is responsible for communicating messages to and from vehicle 120. Communication device 160 is further coupled to a communication assembly system 118 included in vehicle 120. Communication assembly system 118 receives clearance intended message 112 from communication device 160.

Communication system 118 further includes a memory 145 that stores clearance intended message 112. Further, communication system 118 includes a processor 125 that processes the clearance intended messages 112 received by communication device 160 from first station 110. Processor 125 includes communication management function (CMF) 122 that is responsible for identifying the type of message that is received, decoding the message and building a clearance request to send to the second station 130.

As shown in FIG. 1, CMF 122 includes a message identifier 124. When clearance intended message 112 is received by vehicle 120, message identifier 124 identifies that it is a clearance from the phrase appended within the message. For example, in some exemplary embodiments, message identifier 124 identifies message 112 as clearance intended message because the message includes phrase "AM:ATC" within the message.

CMF 122 further includes a message decoder 127 that decodes the clearance intended message 112. After identifying clearance intended message 112 as a message that requires clearance from a second station 130, message decoder 127 decodes the details included in the message 112. In exemplary embodiments, the decoded message is stored in memory 145.

CMF 122 further includes a clearance request builder 128. After decoding message 112, clearance request builder 128 translates the decoded message and generates a clearance request in a format that can be understood by second ground station. In exemplary embodiments, the translated message is saved in memory 145 so that the crew has the availability to review it at a later time. Building the clearance request automatically eliminates extensive steps that are conventionally taken by the user to generate a clearance request.

Communication system 118 further includes a display 150 that displays the details of clearance intended message 112 when it is received. Display 150 is coupled to processor 125, memory 145 and a user input device 140. In exemplary embodiments, display 150 provides a user of vehicle 120 with an option (152) to build the clearance request in a format that can be understood by second ground station 130 prior to sending the clearance request to the second station 130 for approval. When the user input 140 indicates that the user has selected prompt 152, processor 125 builds a clearance request in a format that is understood by second station 130 and the clearance request is automatically sent to second station 130 for approval. In exemplary embodiments, prompt 152 is displayed as a button "Build ATC Request." This request is transmitted to second station 130 via receiving/transmitting communication device 160.

System 100 includes second station 130, which is responsible for approving clearance requests sent by vehicle 120. Response message 132 is received by receiving and transmitting communication device 160 of vehicle 120. After a response message 132 is received by communication device 160, response message 132 can be stored in memory 145 for later retrieval by a user. The response message 132 received from second station 130 may be different from the translated message 142 sent to the second station 130 for approval. For example, the clearance intended message 112 may be an AOC message recommending modification in flight plan while an airplane is in-flight. Such a message would require clearance from an ATC ground station. Accordingly, a clearance request in accordance with the embodiments herein may be generated to send to an ATC ground station for approval. However, the ATC ground station may further modify the request and respond with approval of a revised flight plan that is different from the initial clearance intended message 112. Accordingly, in such examples, the user is able to view the response message 132 on display 150 displayed along with clearance intended message 112 for comparison prior to loading the response message to a flight management system (FMS) of vehicle 120.

Figure 2A:
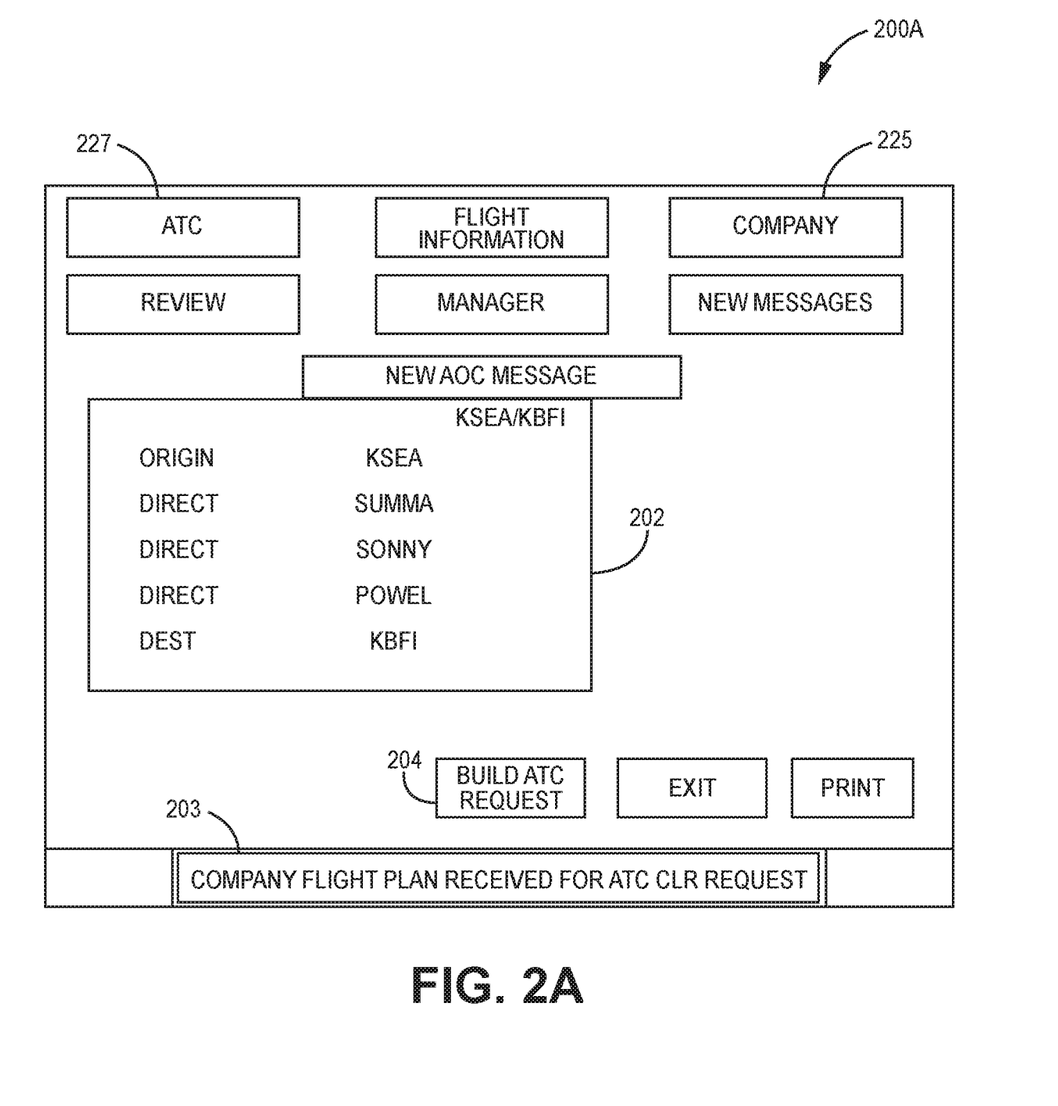
FIGS. 2A-2G illustrates exemplary display screens on a display of vehicle of FIG. 1 based on selection by the user in various steps.

FIGS. 2A-2G illustrate various example display screens on display 150 of vehicle 120 of FIG. 1 based on selection by the user in each step until the response message is loaded to the FMS. FIG. 2A illustrates an exemplary display screen 200A of vehicle 120 displayed when vehicle 120 receives a clearance intended message. Message 203 displayed at the bottom of screen 200A indicates that the company flight plan is received for clearance request. FIG. 2A further displays the detailed clearance intended message 202. In exemplary embodiments, a first tab 225 (for example, "Company") is selected to view one or more messages received from the first station 110. As shown in FIG. 2A, screen 200A also indicates that detailed message 202 is a new AOC message. Further, the user may select prompt 204 to generate a clearance request to send to the second ground station. In exemplary embodiments, when there are multiple pages to view detailed message 202, prompt 204 is displayed only after the user has reviewed all pages of the detailed message 202. When a user selects prompt 204 displayed on screen 200A, processor 125 builds a clearance request in a format that is understood by the second ground station 130 and sends the request to the second ground station 130. In exemplary embodiments, after the request is created, the user has an opportunity to review the request before it is downlinked to the second station 130.

Figure 2B:
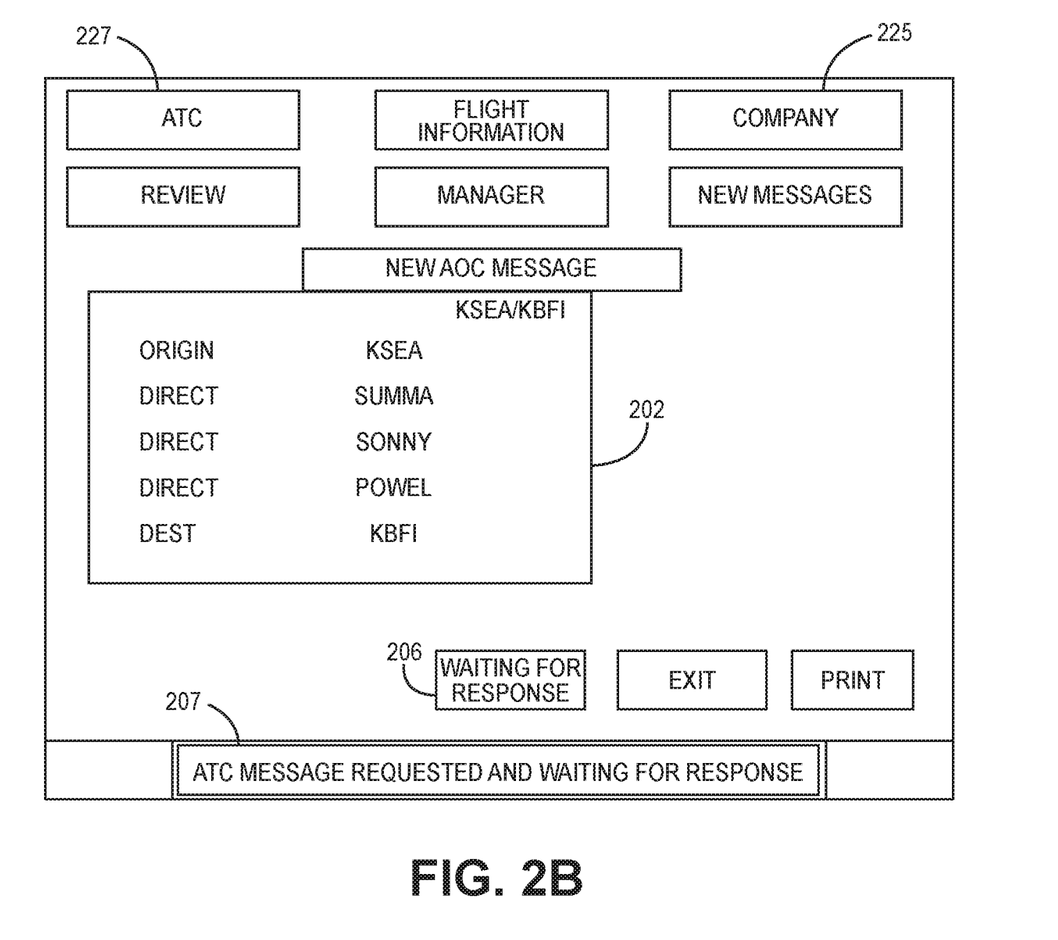

FIG. 2B illustrates exemplary display screen 200B of vehicle 120 displayed after the clearance request is sent to second ground station 130. As shown in FIG. 2B, tab 206 displays the status of the clearance. For example, in FIG. 2B, the status of the clearance is "waiting for ATC response." Further, message 207 displayed at the bottom of screen 200B indicates that the ATC message is requested and the user is waiting for response.

Figure 2C:
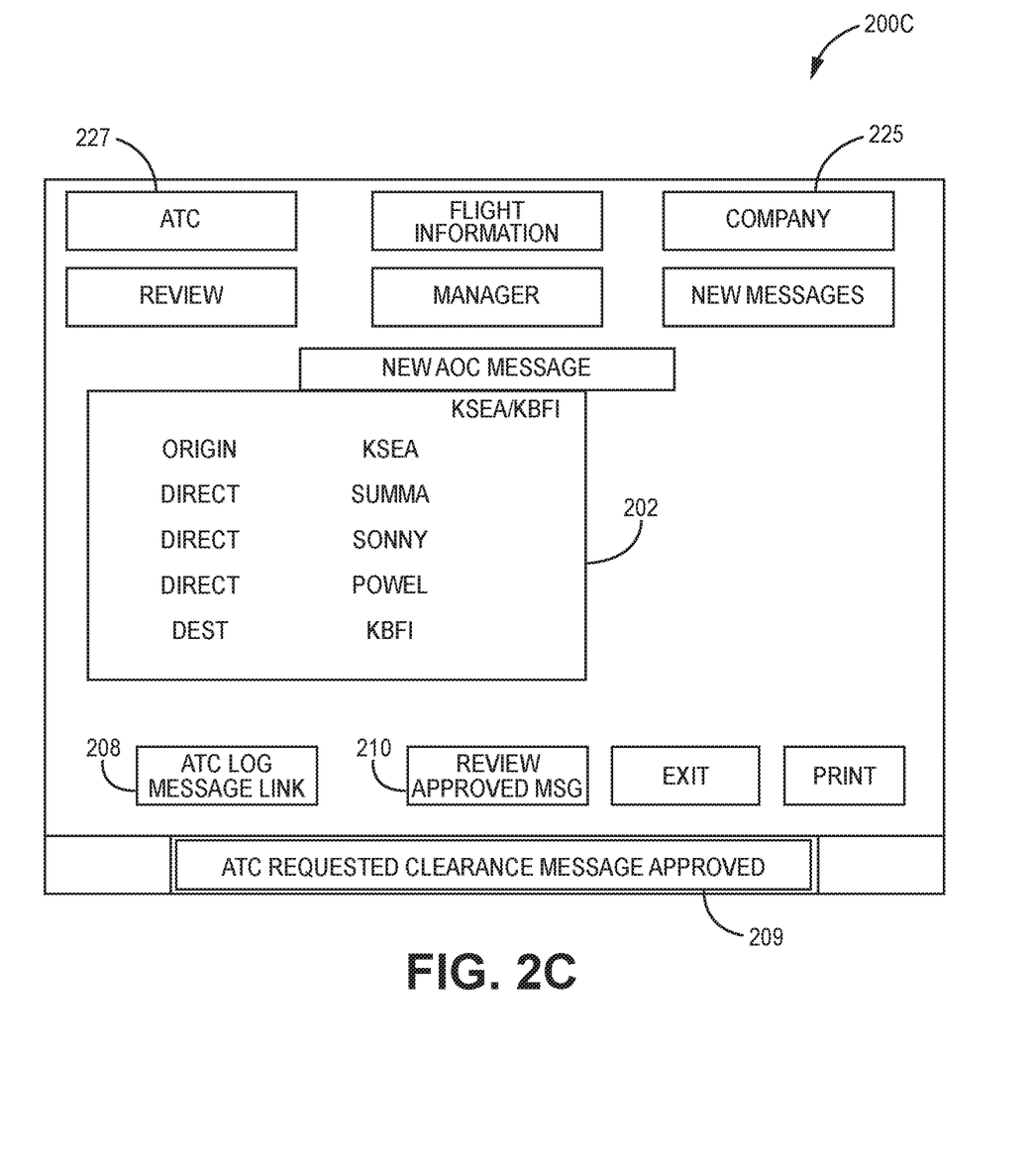

FIG. 2C illustrates exemplary display screen 200C of vehicle 120 displayed after a response has been received by vehicle 120. As shown in FIG. 2C, message 209 is displayed at bottom of screen 200C indicating that the requested clearance has been approved. In exemplary embodiments, the response message, such as response message 132, may be a revised message from second ground station 130. Further, a link is established between a log of messages received from the second ground station and a log of messages received from the first station. Further, the user can perform a quick review of the clearance message log and/or response message prior to loading the response message into an end system such as a flight management system (FMS) of vehicle 120. Accordingly, the user is prompted to select either tab 208 displayed on screen 200C to access the log message link and/or tab 210 displayed on screen 200C to review the response message.

Figure 2D:
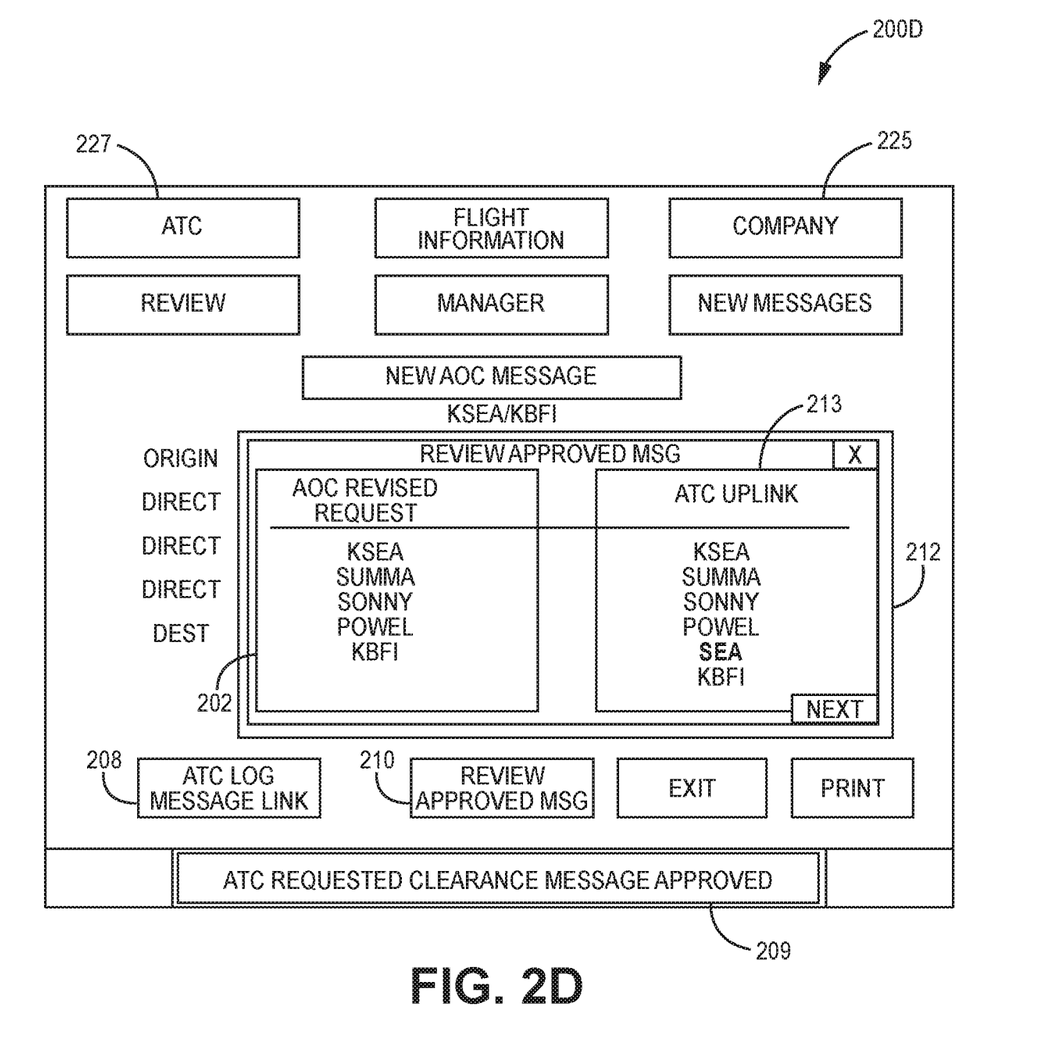

FIG. 2D illustrates exemplary display screen 200D of vehicle 200D, which is displayed when the user selects tab 210 to review the response message (tab 210). As further shown in FIG. 2D, block 212 displayed on screen 200D allows the user to review the uplinked clearance message 213 along with the initial message 202. In the examples shown in FIGS. 2A-2D, the first tab 225 remains selected to view message 202.

Figure 2E:
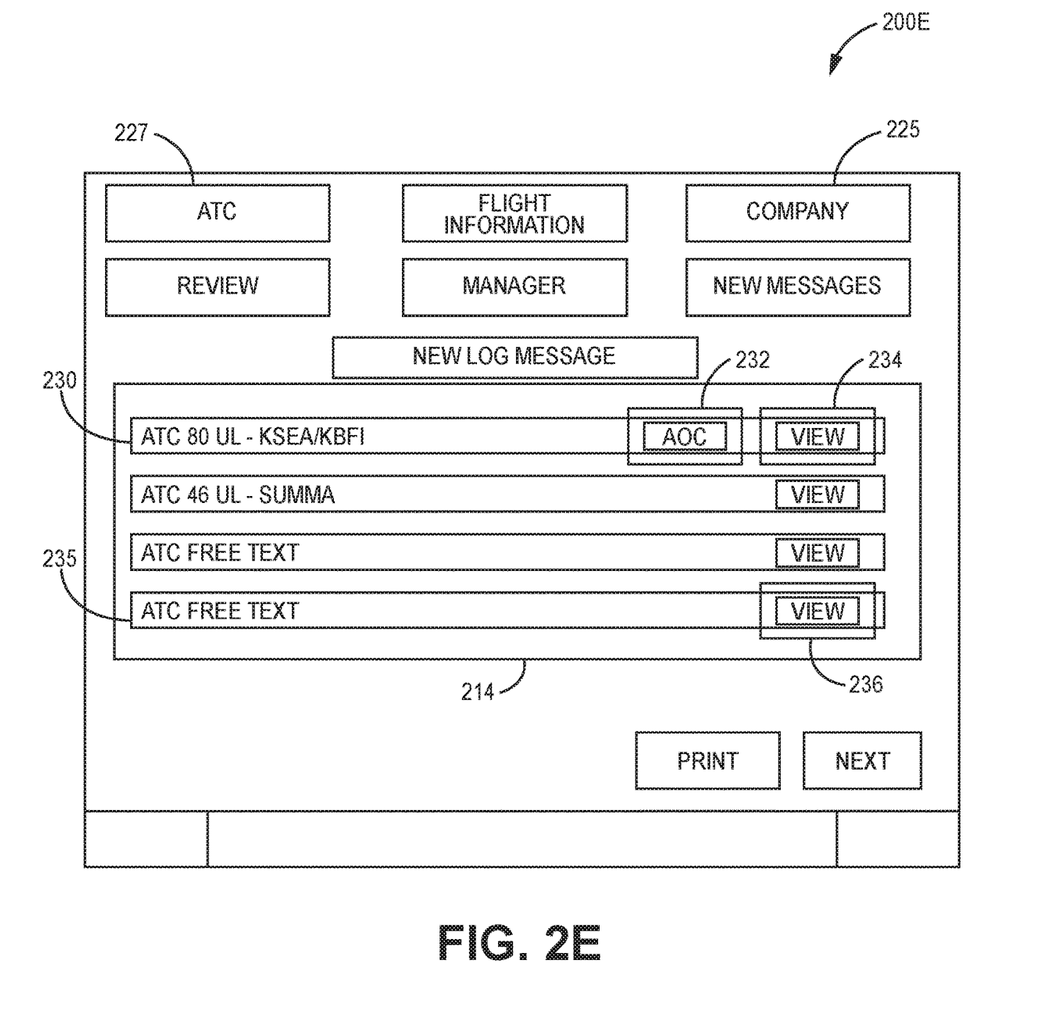

FIG. 2E illustrates exemplary display screen 200E, which is displayed when a second tab 227 ("ATC") is selected. In exemplary embodiments, tab 227 is automatically selected when tab 208 is selected to access the message log from the second station 130, such as the ATC log message link. In the example shown in FIG. 2E, screen 200E is displaying multiple ATC messages received by vehicle 120. Messages 230 and 235 are examples of messages received from the second station 130. The user has option to view the received messages by selecting tabs 234 and/or 236 appended with messages 230 and 235 respectively. Specifically, message 230 is an example of a message received from the second station 130 in response to the translated message 142, which was generated based on clearance intended message 202 received from first ground station 110. In such an example, message 230 is appended with tab 230 indicating that the initial message can be viewed. For example, in FIG. 2E, the clearance intended message 202 can be viewed by selecting AOC tab 232.

Figure 2F:
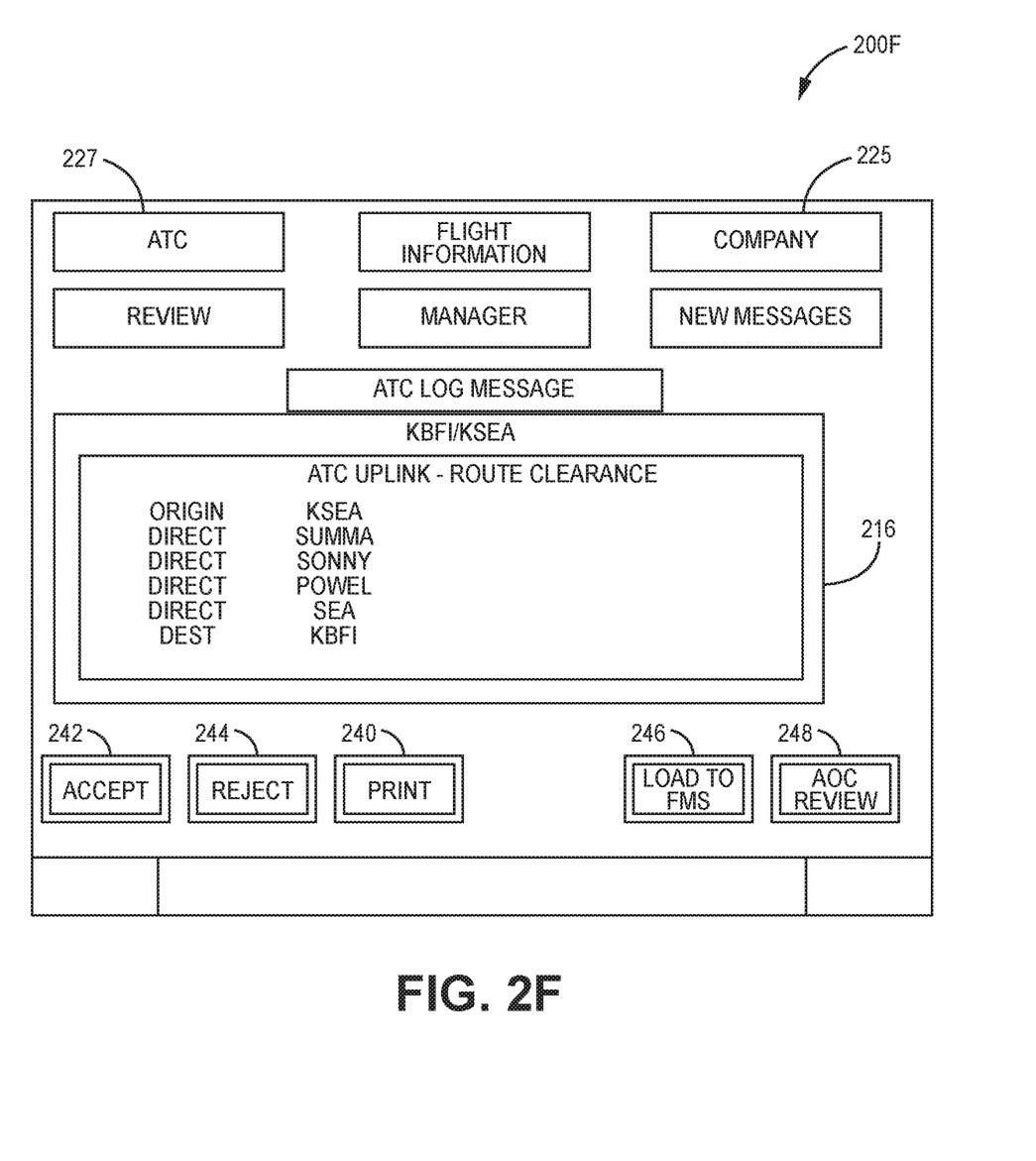

FIG. 2F illustrates exemplary display screen 200F, which is displayed when the user selects tab 232 to view the response message. Received response message 216 is displayed in detail. After reviewing the response message, the user has the option to accept the response message (242) or reject the response message (244). In exemplary embodiments, the user has the option to print the response message (240). Further, in exemplary embodiments, the user may load the response message 216 to the flight management system of the vehicle 120 by selecting tab 246. In exemplary embodiments, prior to confirming or loading message 216, the user may perform a comparison of the response message received from the second station 130 with the initial clearance intended message received from first station 110 by selecting tab 248.

Figure 2G:
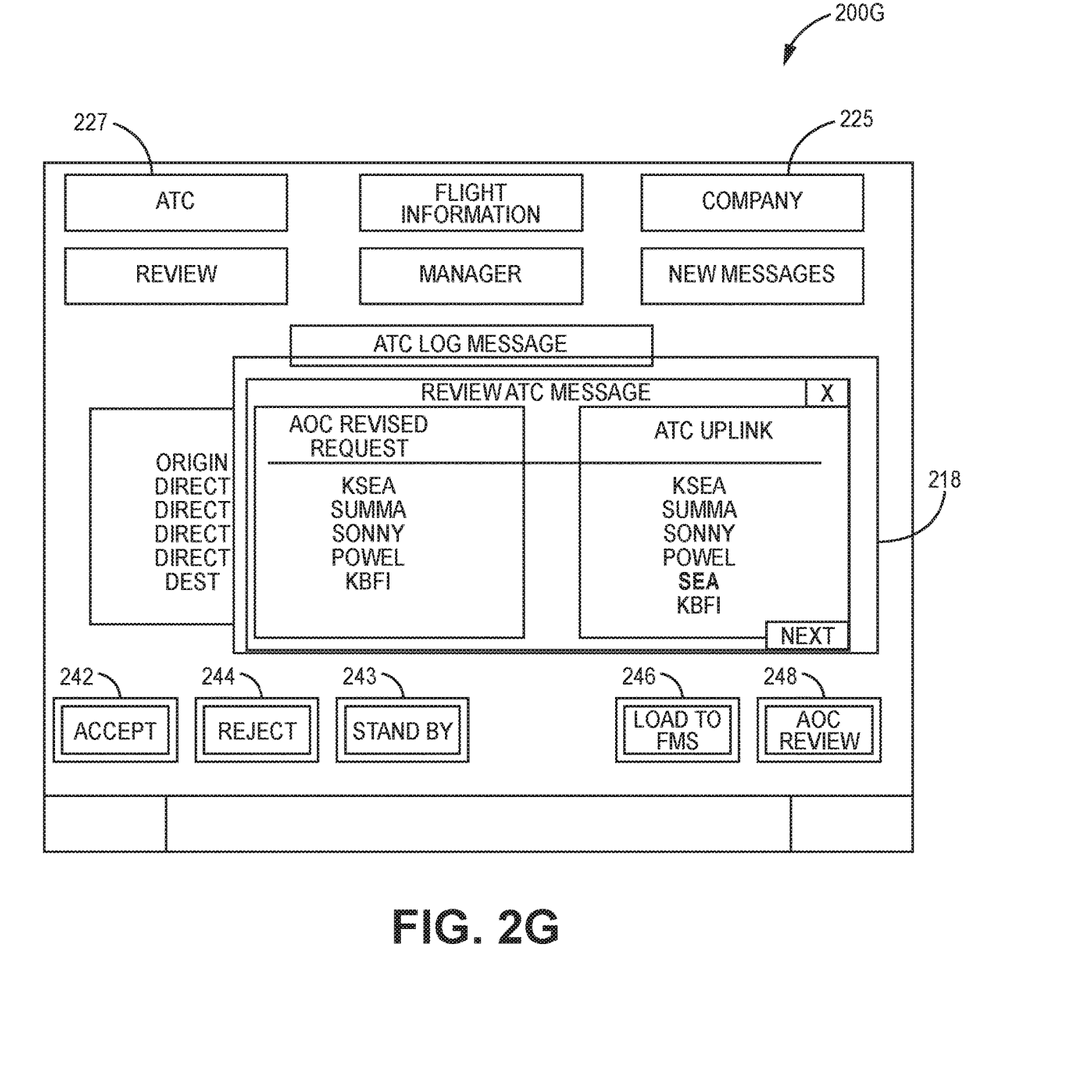

FIG. 2G illustrates exemplary display screen 200G, which displays comparison of the received response message 216 with initial clearance intended message 202 as shown in block 218. As shown in FIG. 2G, printing the message is on standby (tab 243) until the user closes out of the comparison block 218. After performing comparison of the received clearance message and initial message, the user can perform one or more activities shown in tabs 242-248 in FIG. 2F.

Figure 3:
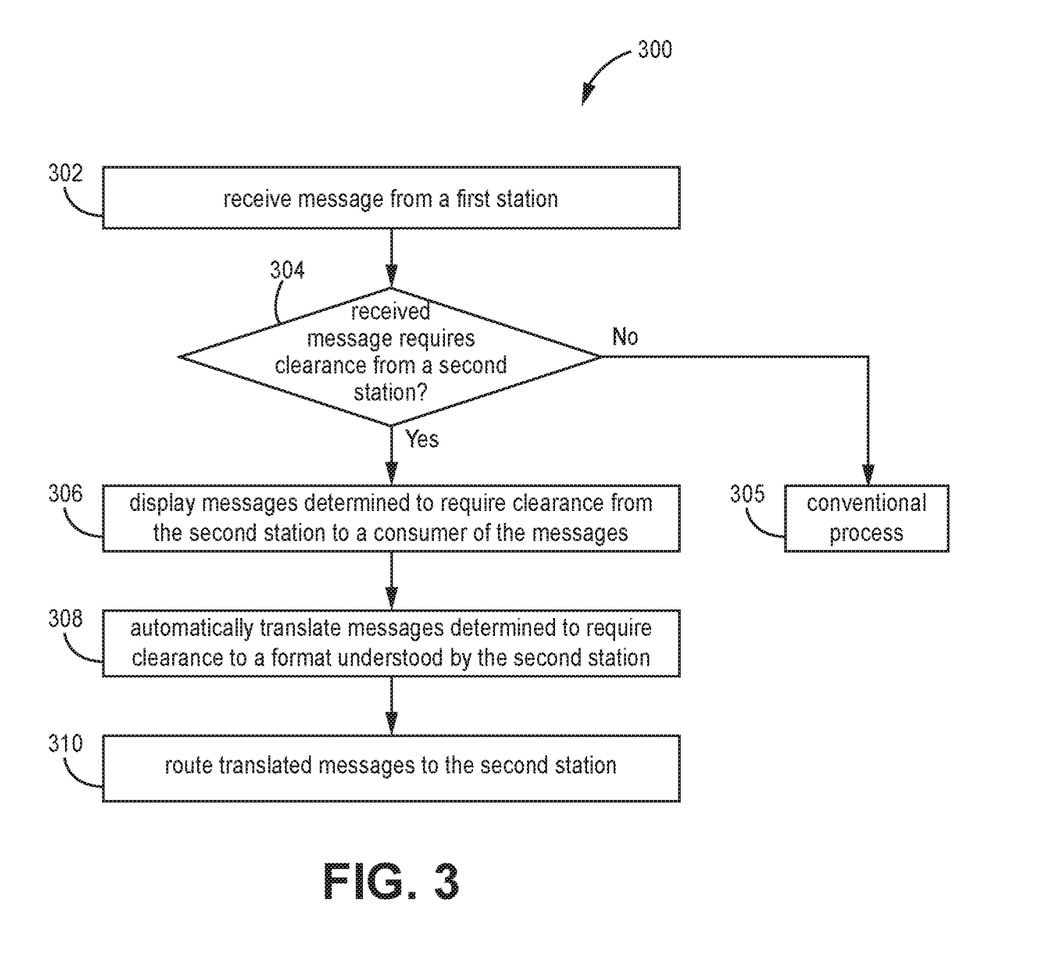
FIG. 3 illustrates a flow diagram of one exemplary embodiment of a method for communicating messages between two stations.

FIG. 3 is a flow diagram of an example method 300 for communicating messages between two stations, such as stations 110 and 130. It should be understood that method 300 may be implemented in conjunction with any of the various embodiments and implementations described in this disclosure above or below. As such, elements of method 300 may be used in conjunction with, in combination with, or substituted for elements of those embodiments. Further, the functions, structures and other description of elements for such embodiments described herein may apply to like named elements of method 300 and vice versa. Further, the example flow diagram is provided as an ordered sequence of steps. Other sequences are possible. Hence, embodiments are not limited to the order of sequence provided in FIG. 3.

Example method 300 begins at block (302) with receiving a message, such as clearance intended message 112, from the first station, such as a first station 110. In exemplary embodiments, first station is an airline operational communications (AOC) ground station When the communication management unit (CMU) of a vehicle, such as vehicle 120, receives a message from the first station, a processor, such as processor 125, begins processing the message. In exemplary embodiments, the vehicle is an airplane. In exemplary embodiments, the first station is an external component in the cockpit and the AOC message is received from the external component in the cockpit. In exemplary embodiments, the clearance intended message is received from an onboard device such as an electronic flight bag (EFB) or a smart device (eg. tablet, smartphone, etc). In exemplary embodiments, the clearance intended message is received from other external devices.

Method 300 then proceeds to block (304) with determining whether the message requires clearance from a second station, such as a second station 130. When the received message is determined to not require clearance from the second station 130, the message proceeds to block (305) and is processed in a conventional manner. When the received message is determined to require clearance from the second station, method 300 proceeds to block 306. In exemplary embodiments, received message is determined to require clearance by receiving an identifier in the message, which indicates that the message requires clearance.

Method 300 proceeds to block (306) with displaying messages determined to require clearance from the second station to a consumer of the messages. The messages are displayed using a display screen, such as display 150. Method 300 then proceeds to block (308) with automatically translating messages determined to require clearance, such as translated message 142, to a format understood by the second station.

Finally, method 300 proceeds to block (310) with routing translated messages to the second station. In exemplary embodiments, prior to routing translated message to the second station, the consumer of the message is prompted, via a prompt such as prompt 152, to input a selection to generate a clearance request to send to the second station.

In exemplary embodiments, method 300 further comprises receiving a response message, such as response message 132, from the second station in reply to the clearance request sent with respect to the initial message. In exemplary embodiments, the response message is displayed on a display of the vehicle and the response message can be reviewed with the clearance intended message for comparison. In further exemplary embodiments, the consumer is prompted to make a selection to review the clearance intended message with the response message. In exemplary embodiments, the response message is loaded to a flight management system.

In accordance with common practice, the various described features are not drawn to scale but are drawn to emphasize specific features relevant to the exemplary embodiments.

Exemplary Embodiments

Example 1 includes a method of communicating messages, the method comprising: receiving a message from a first station; determining whether the message requires clearance from a second station; displaying clearance intended message determined to require clearance from the second station to a consumer of the message; automatically translating the clearance intended message to a format understood by the second station; and routing the translated message to the second station upon selection of the clearance intended message by the consumer of the message.

Example 2 includes the method of Example 1, wherein receiving a message from a first station comprises receiving an airline operational communications (AOC) message from an AOC ground station.

Example 3 includes the method of any of Examples 1-2, further comprising: displaying a response message received from the second station; and prompting the consumer to review the clearance intended message with the response message.

Example 4 includes the method of any of Examples 1-3, wherein receiving a message from a first station comprises receiving the message from an external component in the cockpit.

Example 5 includes the method of any of Examples 1-4, wherein determining whether the message requires clearance comprises receiving an identifier in the message that the message requires clearance.

Example 6 includes the method of any of Examples 1-5, wherein routing the translated message to the second station upon selection of the clearance intended message by the consumer of the message further comprises: prompting the consumer to input selection of generating a clearance request to be sent to the second station; and routing the translated message to the second station upon receiving the consumer input.

Example 7 includes the method of any of Examples 1-6, wherein receiving the message from a first station comprises receiving the message from at least one of an electronic flight bag (EFB) application, a tablet and a smartphone.

Example 8 includes the method of any of Examples 1-7, further comprising: loading a response message received from the second station in response to the translated message to a flight management system (FMS).

Example 9 includes a communication system, the system comprising: a display; a user input; a communication assembly to provide communication functions of a vehicle, the communication assembly configured to communicate with at least a remote first station and a remote second station, the communication assembly including: at least one processor in communication with the display and user input, the at least one processor configured to: determine if a message received from the first station requires clearance from the second station, display each clearance required message to a consumer of the message via the display, automatically translate each clearance intended message to a format understood by the second station; and cause the communication assembly to communicate each translated clearance intended message to the second station based upon an input of a consumer of the message via the user input.

Example 10 includes the communication system of Example 9, wherein the communication assembly further includes: a memory to store at least one of the clearance intended message, the translated message and the response message; and a communication management function including: a message identifier configured to determine if the message received from the first station includes an identifier to determine the message as a message that requires clearance from the second station; a message decoder that decodes the details of the clearance intended message; and a clearance request builder to generate a clearance request to be communicated to the second station for approval.

Example 11 includes the communication system of any of Examples 9-10, wherein the vehicle is an aircraft.

Example 12 includes the communication system of any of Examples 9-11, wherein the clearance intended message is an airline operational communications (AOC) message.

Example 13 includes the communication system of any of Examples 9-12, wherein the processor is further configured to: display at least one of a response message received from the second station and the clearance message.

Example 14 includes the communication system of any of Examples 9-13, wherein the clearance intended message is received from an external component in the cockpit.

Example 15 includes the communication system of any of Examples 9-14, wherein the clearance intended message includes an element identifier to identify the clearance intended message is a message that requires clearance from the second station.

Example 16 includes the communication system of any of Examples 9-15, wherein the processor is further configured to load the clearance message that has been given clearance from the second station to a flight management system (FMS).

Example 17 includes the communication system of Examples 9-16, wherein the at least one of an electronic flight bag (EFB) application, a tablet and a smartphone.

Example 18 includes a non-transitory computer readable medium storing a program having instructions stored thereon, executable by a processor, to perform a method for interfacing between first and second electronic systems, the method comprising: determining whether a message received from a first station requires clearance from a second station; displaying clearance intended message determined to require clearance from the second station to a consumer of the messages; automatically translating the clearance intended message to a format understood by the second station; and routing the translated message to the second station upon selection of the clearance intended message by the consumer of the message.

Example 19 includes the non-transitory computer readable medium of any of Example 18, wherein determining whether the message requires clearance comprises receiving an identifier in the message that the message requires clearance.

Example 20 includes the non-transitory computer readable medium of Examples 19-20, receiving a message from a first station comprises receiving an airline operational communications (AOC) message from an AOC ground station.

In various alternative embodiments, system elements, method steps, or examples described throughout this disclosure (such as the processor 125 and/or sub-parts thereof, for example) may be implemented using one or more computer systems, field programmable gate arrays (FPGAs), or similar devices and/or comprising a processor coupled to a memory and executing code to realize those elements, processes, steps or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method of communicating messages, the method comprising:
   receiving a message from a first station, wherein receiving the message from the first station comprises receiving an airline operational communications (AOC) message from an AOC ground station;
   automatically determining whether the message from the first station is a clearance intended message that requires clearance from a second station based on an element identifier in the message that is detected by a processor;
   when it is determined the message from the first station requires clearance from the second station, automatically identifying on a display that the message requires clearance from the second station;
   decoding the determined message that requires clearance;
   automatically building a clearance request for the decoded message by automatically translating the decoded message to a format understood by the second station;
   storing the translated message in a memory; and
   routing the translated message to the second station upon selection of the clearance intended message by a consumer of the message.

2. The method of claim 1, further comprising:
   displaying a response message received from the second station; and
   prompting the consumer to review the clearance intended message with the response message.

3. The method of claim 1, wherein receiving a message from a first station comprises receiving the message from an external component in a cockpit.

4. The method of claim 1, wherein automatically determining whether the message from the first station requires clearance comprises receiving an identifier in the message that the message requires clearance.

5. The method of claim 1, wherein routing the translated message to the second station upon selection of the clearance intended message by the consumer of the message further comprises:
   prompting the consumer to input selection of generating a clearance request to be sent to the second station; and
   routing the translated message to the second station upon receiving the consumer input.

6. The method of claim 1, wherein receiving the message from a first station comprises receiving the message from at least one of an electronic flight bag (EFB) application, a tablet and a smartphone.

7. The method of claim 1, further comprising: loading a response message received from the second station in response to the translated message to a flight management system (FMS).

8. A communication system, the system comprising:
   a display;
   a user input; and
   a communication assembly to provide communication functions of a vehicle, the communication assembly configured to communicate with at least a remote first station and a remote second station, the communication assembly including:
   at least one processor in communication with the display and user input, the at least one processor configured to:
      automatically determine if a message received from the first station is a clearance intended message that requires clearance from the second station based on an element identifier in the message, wherein the message is an airline operational communications (AOC) message and the first station is an AOC ground station,
      when it is determined the message from the first station requires clearance from the second station, automatically identifying on a display that the message requires clearance from the second station,
      decode the determined message that requires clearance, automatically build a clearance request for the decoded message by automatically translating each decoded message to a format understood by the second station, storing the translated message in a memory, and cause the communication assembly to communicate each translated message to the second station based upon an input of a consumer of the message via the user input.

9. The communication system of claim 8, wherein the communication assembly further includes:

the memory to store at least one of the clearance intended message, the translated message and a response message; and a communication management function implemented by the at least one processor, the communication management function including:

a message identifier configured to determine if the message received from the first station includes an identifier to determine the message as a message that requires clearance from the second station;

a message decoder that decodes details of the clearance intended message; and a clearance request builder to generate a clearance request to be communicated to the second station for approval.

10. The communication system of claim 8, wherein the vehicle is an aircraft.

11. The communication system of claim 8, wherein the processor is further configured to:

display at least one of a response message received from the second station and the clearance message.

12. The communication system of claim 8, wherein the clearance intended message is received from an external component in a cockpit.

13. The communication system of claim 8, wherein the clearance intended message includes an element identifier to identify the clearance intended message is a message that requires clearance from the second station.

14. The communication system of claim 8, wherein the processor is further configured to load the clearance intended message that has been given clearance from the second station to a flight management system (FMS).

15. The communication system of claim 8, wherein the at least one of an electronic flight bag (EFB) application, a tablet and a smartphone.

16. A non-transitory computer readable medium storing a program having instructions stored thereon, executable by a processor, to perform a method for interfacing between first and second electronic systems, the method comprising:

automatically determining whether a message received from a first station requires clearance from a second station based on an element identifier in the message that is detected by the processor, wherein the message is an airline operational communications (AOC) message and the first station is an AOC ground station;

when it is determined the message from the first station requires clearance from the second station, automatically identifying on a display that the message requires clearance from the second station;

decoding the determined message that requires clearance;

automatically building a clearance request for the decoded message by automatically translating the decoded message to a format understood by the second station;

storing the translated message in a memory; and routing the translated message to the second station upon selection of the clearance intended message by a consumer of the message.

17. The non-transitory computer readable medium of claim 16, wherein automatically determining whether the message requires clearance comprises receiving an identifier in the message that the message requires clearance.

* * * * *